Jan. 7, 1964  A. J. ANDERSON  3,116,852
PROPORTIONING APPARATUS
Filed Aug. 8, 1960  10 Sheets-Sheet 1

INVENTOR.
ALFRED J. ANDERSON
BY
*Eyl, Mann & Lucas*
ATTORNEYS.

INVENTOR.
ALFRED J. ANDERSON
BY
*Eyre, Mann & Lucas*
ATTORNEYS.

INVENTOR.
ALFRED J. ANDERSON
BY
*Eyre, Mann & Lucas*
ATTORNEYS.

Jan. 7, 1964 A. J. ANDERSON 3,116,852
PROPORTIONING APPARATUS
Filed Aug. 8, 1960 10 Sheets-Sheet 4
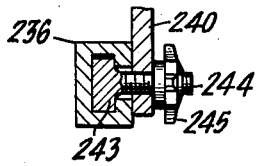
FIG. 6.
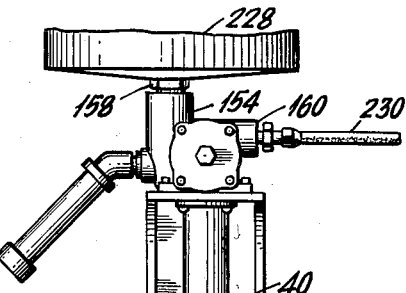
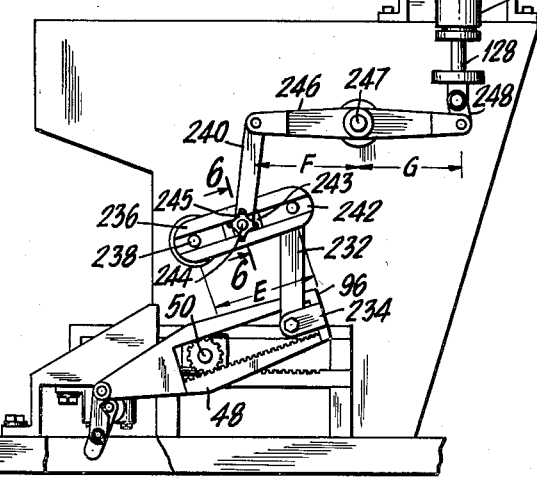
FIG. 16.
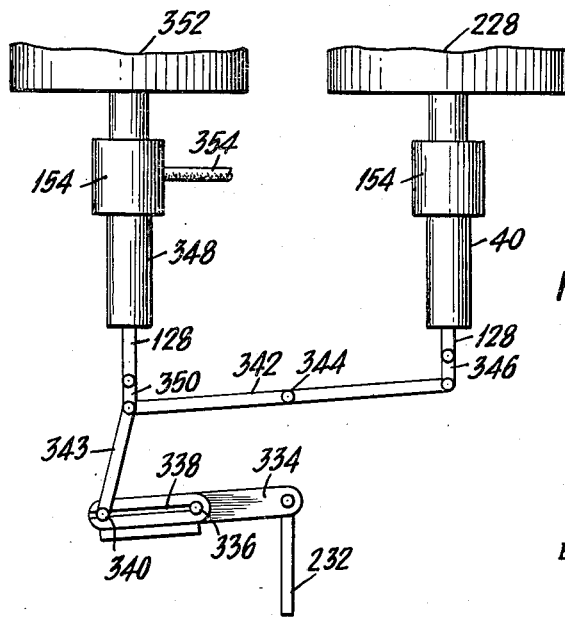
FIG. 17.
INVENTOR.
ALFRED J. ANDERSON
BY
Eyre, Mann & Lucas
ATTORNEYS Jan. 7, 1964  A. J. ANDERSON  3,116,852
PROPORTIONING APPARATUS
Filed Aug. 8, 1960  10 Sheets-Sheet 5

INVENTOR.
ALFRED J. ANDERSON
BY
*Eyre, Mann & Lucas*
ATTORNEYS.

Jan. 7, 1964

A. J. ANDERSON 3,116,852

PROPORTIONING APPARATUS

Filed Aug. 8, 1960

INVENTOR.
ALFRED J. ANDERSON
BY

*Eyre, Mann & Lucas*
ATTORNEYS.

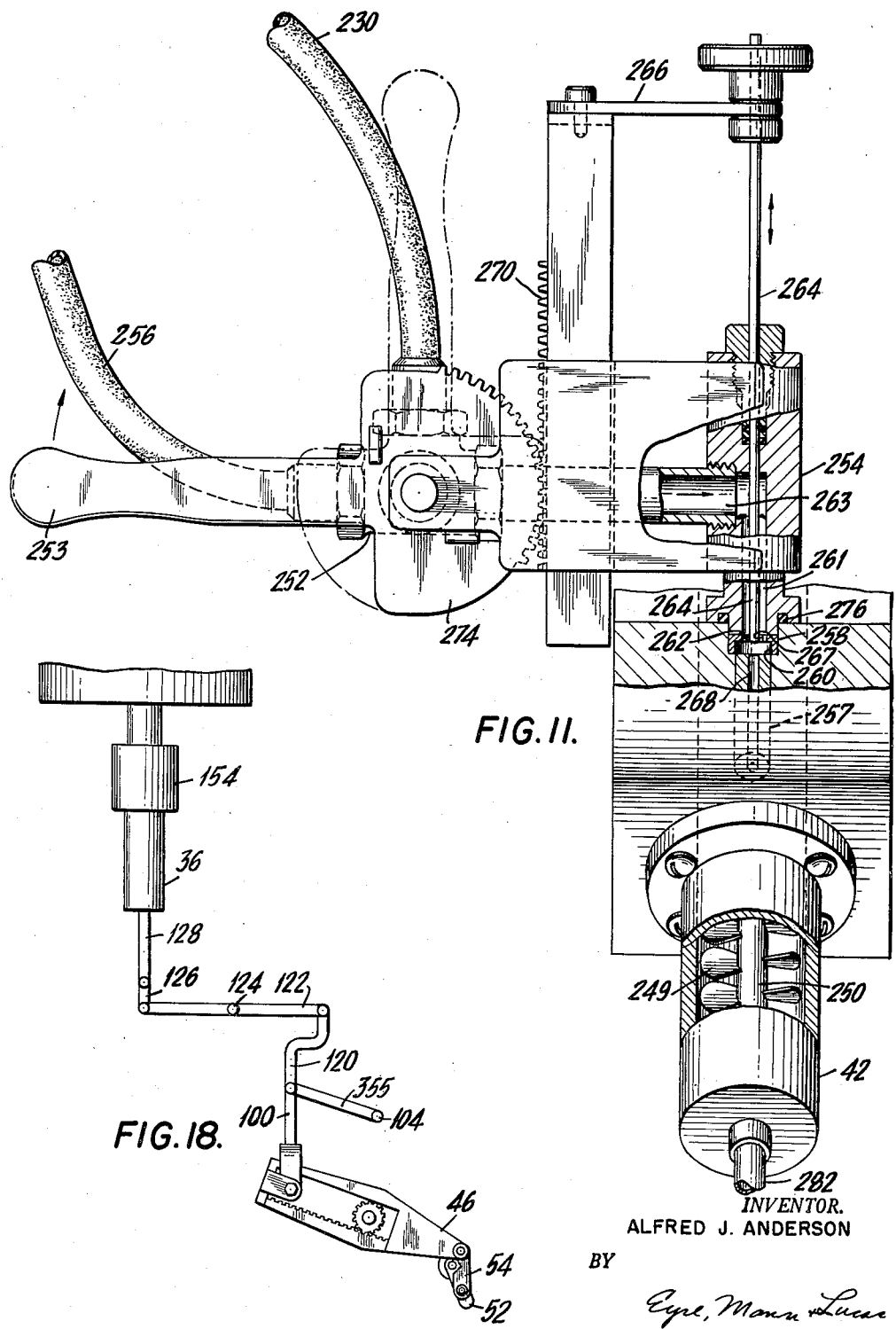

Jan. 7, 1964  A. J. ANDERSON  3,116,852
PROPORTIONING APPARATUS
Filed Aug. 8, 1960  10 Sheets-Sheet 8
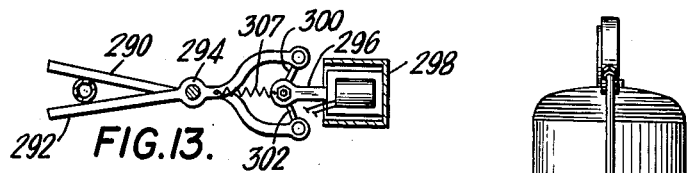
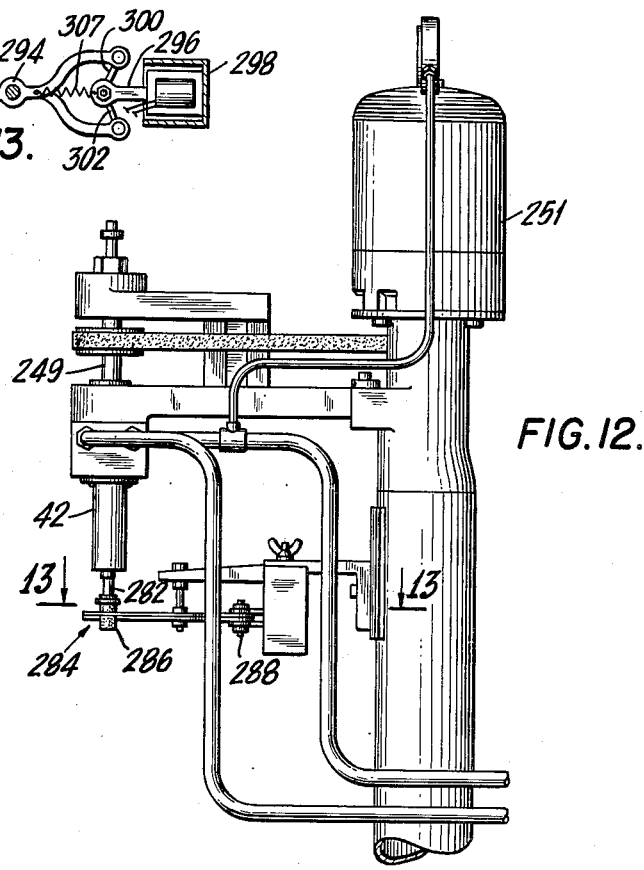
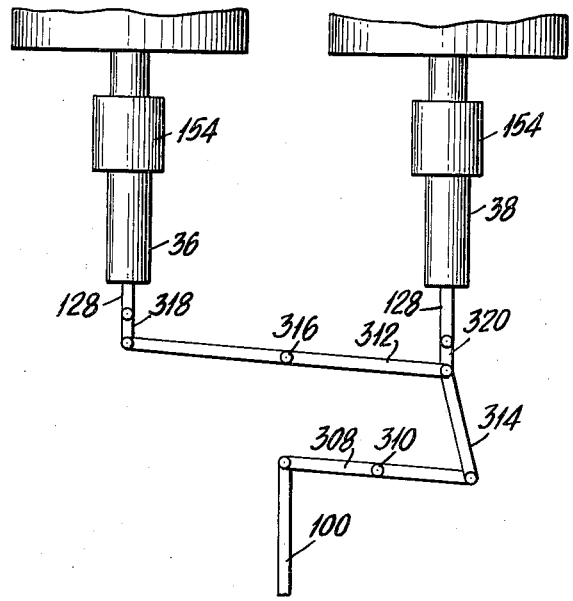
INVENTOR.
ALFRED J. ANDERSON
BY
Eyre, Mann & Lucas
ATTORNEYS.

Jan. 7, 1964 A. J. ANDERSON 3,116,852
PROPORTIONING APPARATUS
Filed Aug. 8, 1960 10 Sheets-Sheet 9

INVENTOR.
ALFRED J. ANDERSON
BY
*Eyre, Mann & Lucas*
ATTORNEYS.

INVENTOR.
ALFRED J. ANDERSON
BY
Eyre, Mann & Lucas
ATTORNEYS.

United States Patent Office 3,116,852
Patented Jan. 7, 1964

3,116,852
PROPORTIONING APPARATUS
Alfred J. Anderson, Livingston, N.J., assignor to H. V. Hardman Company, Inc., a corporation of New Jersey
Filed Aug. 8, 1960, Ser. No. 48,005
21 Claims. (Cl. 222—21)

This invention relates to the method and apparatus for metering, mixing and dispensing proportionate amounts of two or more different liquids. The apparatus of the present invention is particularly useful for mixing a catalyst with a synthetic base resin especially in those cases where the catalized resin has a short pot life and it is desirable to deliver small amounts of resin of the order of 0.3 to 60.0 mol. for use as a potting compound for electrical elements or in setting the bristles in a paint brush.

In accordance with the present invention two or more pumps are driven by means of a single source of power and a so-called walking beam arrangement is employed for synchronizing the pumps so that the amount of liquid mixture dispensed may be changed without changing the proportion of the individual liquids in the mixture and at the same time the proportion of a given liquid in the mixture may be changed without changing the total amount of liquid that is dispensed. A timing device controls the pot life of catalyzed resin to prevent the resin from curing and setting up in the apparatus.

These and other advantages of the method and structure of the present invention may be readily understood by reference to the accompanying drawings in which:

FIG. 6 is a sectional view taken on line 6—6 of FIG. 16;

FIG. 11 illustrates an antiplugging device for the catalyst inlet to the mixing chamber;

FIG. 12 illustrates a device for controlling the dispensing nozzle of the mixing chamber;

FIG. 13 illustrates the construction of the control device of FIG. 12;

FIG. 15 illustrates a modified form of construction for continuous pumping of liquid to the mixing chamber;

FIG. 16 illustrates a preferred form of structure for pumping liquid catalyst to the mixing chamber;

FIG. 17 illustrates a preferred form of structure for a modified form of apparatus;

FIG. 18 illustrates a preferred form of structure for pumping base resin to the mixing chamber from a single source of supply.

Figures 1, 7:
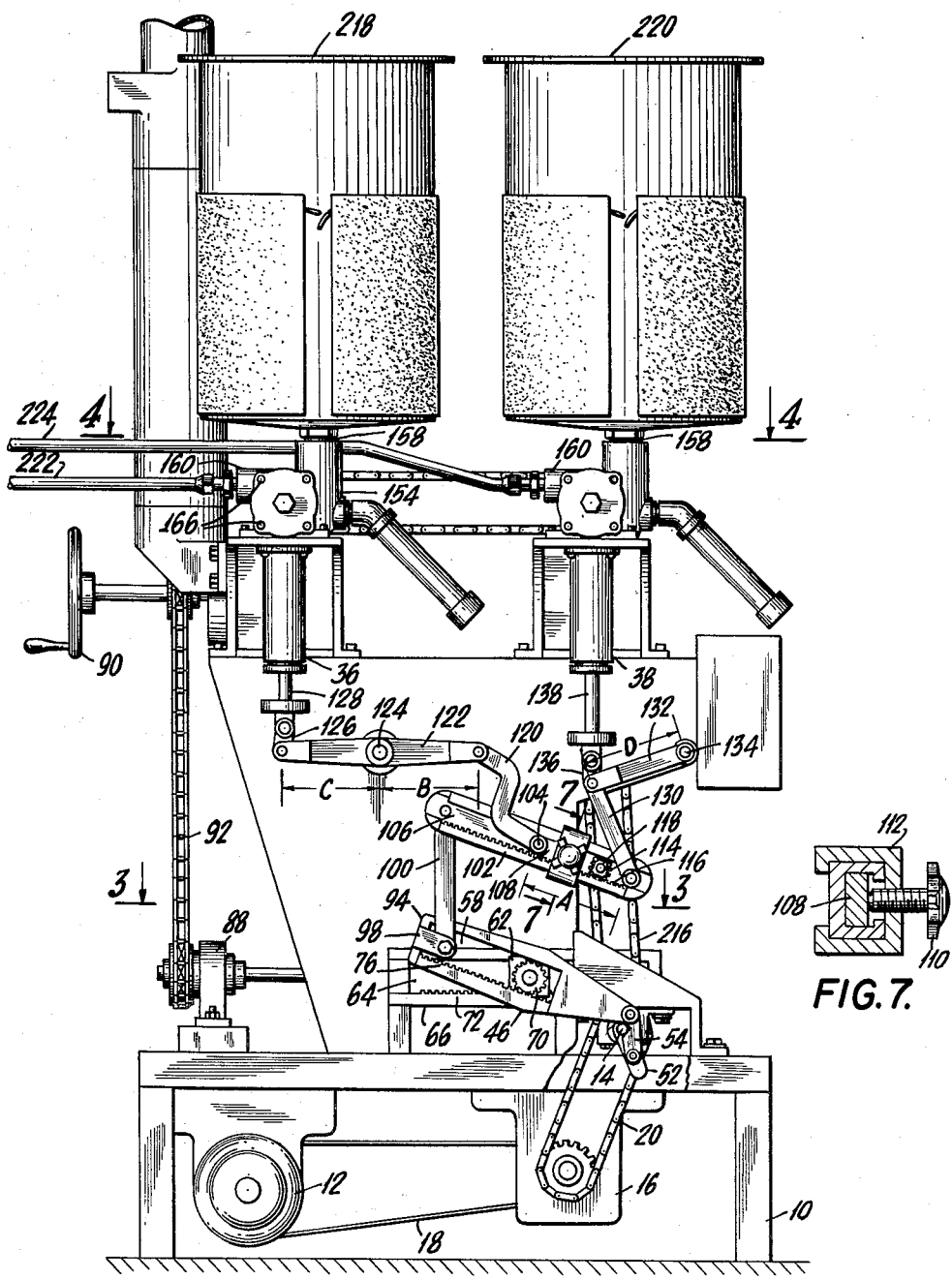
FIG. 1 is a side view of the pumping apparatus of the present invention.
FIG. 7 is taken on line 7—7 of FIG. 1.

The proportioning apparatus of the present invention is mounted in a support such as framework 10 and it includes an electric motor 12 or other suitable source of power which drives a main drive shaft 14 (FIG. 1) through a conventional speed reduction gear box 16 by means of a belt 18 and the chain and sprocket drive 20. The chain and sprocket drive 20 is connected to shaft 14 by means of a conventional single revolution clutch 22 (FIG. 3) so that each time the single revolution clutch is actuated shaft 14 will make one complete revolution. Otherwise the chain and sprocket run free of the shaft and during operation motor 12 runs continuously as does the chain and sprocket drive.

Figure 3:
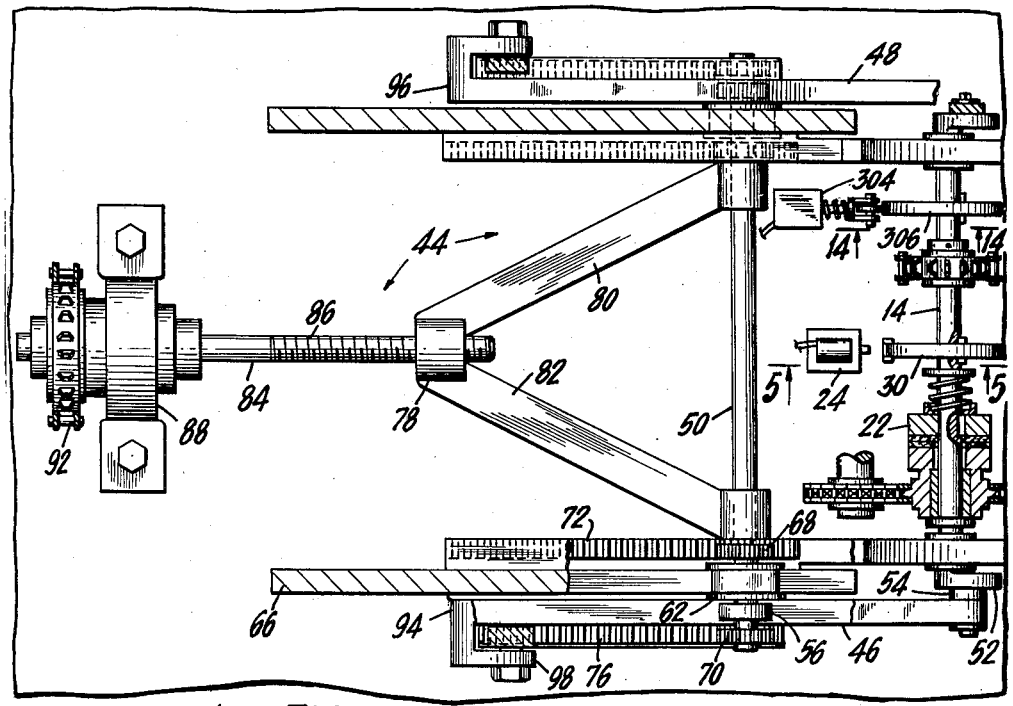
FIG. 3 is taken on line 3—3 of FIG. 1.
Figures 4, 5, 14:
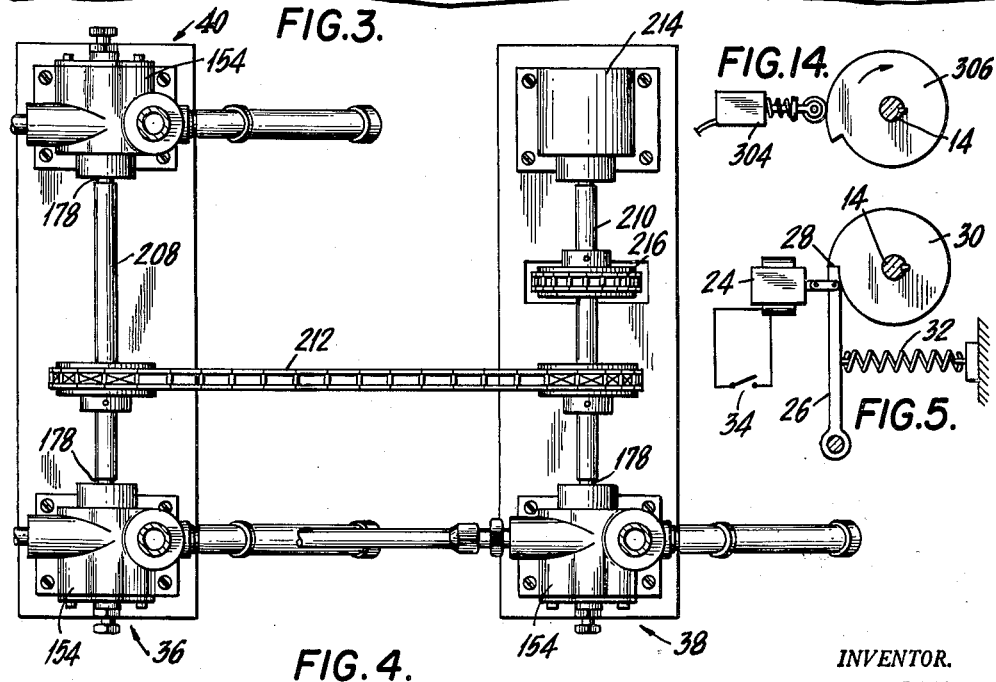
FIG. 4 is taken on line 4—4 of FIG. 1.
FIG. 5 illustrates the single revolution clutch which controls the pumping of liquids.
FIG. 14 illustrates a microswitch for the control device of FIG. 12.

As illustrated in FIGS. 3 and 5 the single revolution clutch 22 is actuated in conventional manner by means of solenoid 24 which is connected to the spring tensioned pivotal arm 26 which is normally held in position under notch 28 of cam 30 of the single revolution clutch by means of spring 32. When the solenoid is actuated by closing switch 34 the pivotal arm 26 is moved to the left (FIG. 5) out from under notch 28 and this causes the clutch to become engaged so that shaft 14 and cam 30 will rotate. After rotation starts spring 32 tensions arm 26 against the periphery of cam 30 and at the end of a single revolution arm 26 again engages notch 28 to disengage the clutch. The solenoid switch 34 is normally held in open position by means of a spring (not shown) and switch 34 may be held closed for continuous operation of shaft 14 or closed and then released for a single revolution of shaft 14.

Each time shaft 14 makes a single revolution pumps 36, 38 and 40 (FIGS. 1 and 2) are actuated to deliver liquid to a mixing chamber 42 (later described) and the amount of liquid delivered by the pumps is controlled by means of the walking beam arrangement 44 (FIG. 3). The walking beam arrangement comprises a pair of so-called walking beams 46 and 48 respectively which pivot on a shaft 50. Shaft 50 is positioned parallel to shaft 14 and shaft 50 is moved lengthwise along the walking beams in order to change the pivot point of the beam and thereby change the amount of liquid delivered by the pumps without changing the proportion of each liquid delivered to mixing chamber 42. Since each of the walking beams are pivotally mounted and driven by identical elements it is only deemed necessary to describe the mounting for one of the walking beams.

Walking beam 46 is connected to shaft 14 by means of an eccentric arm 52 and link 54. The beam is mounted on the shaft 50 by means of a bearing 56 which is rotatively mounted on shaft 50 so that it is free to roll in slot 58 (FIGS. 1 and 3) of the walking beam 46. Shaft 50 is in turn supported by slide block 62 which is rotatively mounted on shaft 50 and free to slide in slot 64 of the fixed support member 66 which carries the weight of the shaft. The position of shaft 50 in slot 58 of the walking beam is changed by means of a pair of gears 68 and 70 respectively each of which is mounted in fixed position on the shaft. Gears 68 is in meshed engagement with a gear rack 72 mounted on the fixed support 66 in framework 10 and gear 70 is in meshed engagement with gear rack 76 mounted in fixed position on the walking beam. With this construction when shaft 50 is moved it is caused to rotate by gear 68 and gear rack 72 and as a result gear 70 is caused to walk along gear rack 76 so that shaft 50 will slide along in slot 58 on bearing 56 into the desired position.

Movement of shaft 50 in the slots of the walking beams 46 and 48 is controlled by means of a yoke 78 which is connected to shaft 50 by means of a pair of arms 80 and 82 respectively each of which is rotatively mounted on the shaft. A shaft 84 having screw threads 86 which engage corresponding fixed threads (not shown) in yoke 78 is rotatively mounted at the second end in the fixed support 88. The shaft 84 is connected to a handwheel 90 by means of the chain and sprocket drive 92 (FIG. 1). Rotation of handwheel 90 causes the yoke to move towards or away from the fixed support 88 and as a result shaft 50 is caused to change position in the slots of both walking beams 46 and 48.

As best shown in FIG. 3 the walking beams 46 and 48 are of identical construction and the beams are mounted parallel to each other. Since shaft 50 is also mounted parallel to shaft 14 the magnitude of reciprocation of the ends of the walking beams 94 and 96 respectively will be the same for all positions of shaft 50 in the slots of the respective walking beams. In this connection it is to be noted that the position of shaft 50 in the slots of the walking beams may be changed while the beams are in motion so that it is not necessary to stop pumping in order to change the amount of liquid delivered by the pumps.

Figure 2:
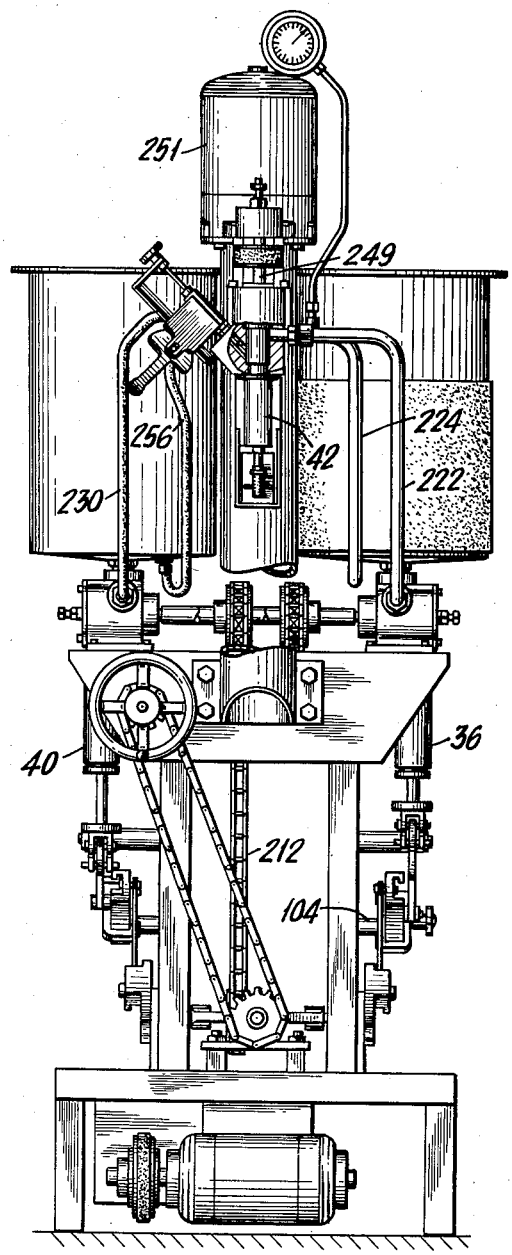
FIG. 2 is an end view of the proportioning apparatus showing the mixing chamber for the resin and catalyst.

Referring again to FIGS. 1 and 3 it will be seen that the end 94 of walking beam 46 is provided with a bracket 98 which carries a link 100 which transmits reciprocation of the walking beam to a pivot arm 102 which is pivotally mounted on a fixed pivot 104 (FIG. 2). Pivot arm 102 is provided with a slot 106 which carries a slide bar 108 which is clamped in position in the slot by means of a set screw 110 and C clamp 112 (FIG. 7). A gear 114 rotatively mounted in fixed position on slide bar 108 is in meshed engagement with stationary gear rack 116 on the pivotal arm 102. The gear is rotated by knob 118 and in order to change the position of the slide bar 108 set screw 110 is loosened and then knob 118 is rotated which causes the gear 114 to rotate and move the slide bar in slot 106 of pivot arm 102.

Reciprocation of pivot arm 102 is transmitted to the reciprocating pump 36 by means of a link 120 which is attached to one end of slide bar 108 and at the other end to a pivot arm 122 which is in turn pivotally mounted on the fixed pivot 124. Link 126 attached at one end to piston rod 128 of reciprocating pump 36 and at the other end to arm 122 transmits reciprocating motion to pump 36.

Reciprocation of arm 102 is transmitted to the reciprocating pump 38 by means of a link 130 which is attached to the second end of slide bar 108 and at the other end to a pivot arm 132 which is pivotally mounted on a fixed pivot 134. Fixed pivot 134 is preferably positioned in a horizontal plane that includes the fixed pivot 124. Link 136 attached at one end to piston rod 138 of reciprocating pump 38 and at the other end to arm 132 transmits the reciprocating motion to pump 38.

In the preferred form of structure shown in the drawings the length of the pivot arms A (slide bar 102), B, C and D are all of equal length and as a result when the center of slide bar 108 is positioned at dead center of the fixed pivot 104 the magnitude of reciprocation of each end of the slide bar relative to pivot 104 will be exactly equal and since the length of pivot arm D equals the length of pivot arm B which is in turn equal to the length of pivot arm C the magnitude of reciprocation of each of the piston rods 128 and 138 will be exactly equal. Since pumps 36 and 38 are of the same size and capacity each pump will deliver exactly one half of the total amount of liquid delivered by both pumps. It will be understood that pumps 36 and 38 need not be of the same size and capacity. If the pumps have different pumping capacity each pump will deliver a proportionate amount of the total liquid depending upon the relative capacity of the pumps.

Movement of slide bar 108 in slot 106 of pivot arm 102 will not effect the total amount of liquid delivered by pumps 36 and 38 but will change the proportion of total liquid delivered by each pump. In such case the size and capacity of pumps 36 and 38 are identical as shown in the drawings. For example if slide bar 108 is moved to the left in FIG. 1 so that one third of the slide bar is positioned to the left of the center of fixed pivot 104 pump 36 will deliver thirty three and one third of the total liquid delivered by the pumps and pump 38 will in such case deliver sixty six and two thirds percent of the total. If the pivotal point of link 130 in slide bar 108 is positioned on dead center of the fixed pivot 104 pump 38 will be inoperative and it will not pump any liquid but pump 36 will deliver one hundred percent of the liquid to mixing chamber 42. The total amount of liquid delivered to mixing chamber 42 by pumps 36 and 38 will be the same regardless of the position of slide bar 108 in slot 106 provides the pivotal points of links 120 and 130 in the slide bar are not both positioned to the left (or right) of the fixed pivot 104 of arm 102.

The total amount of liquid delivered by the two pumps 36 and 38 may be changed by changing the magnitude of reciprocation of end 94 of the walking beam 46 which as previously described hereinabove may readily be done by changing the position of shaft 50 in the slot of the walking beam. The amount of liquid delivered by pumps 36 and 38 may be reduced to zero by positioning the center of shaft 50 of the walking beam under the pivotal point of link 100. Bracket 98 projects out far enough from the surface of the walking beam so that shaft 50 with gear 70 may be moved in under the bracket behind the pivotal point of link 100.

Pumps 36, 38 and 40 are a conventional type of reciprocating pump used for pumping measured amounts of liquids and the magnitude of reciprocation of the piston of the pump determines the amount of liquid delivered by the pump which varies as a linear function of the magnitude of reciprocation of the piston. Pumps 36, 38 and 40 are of identical construction.

Figure 8:
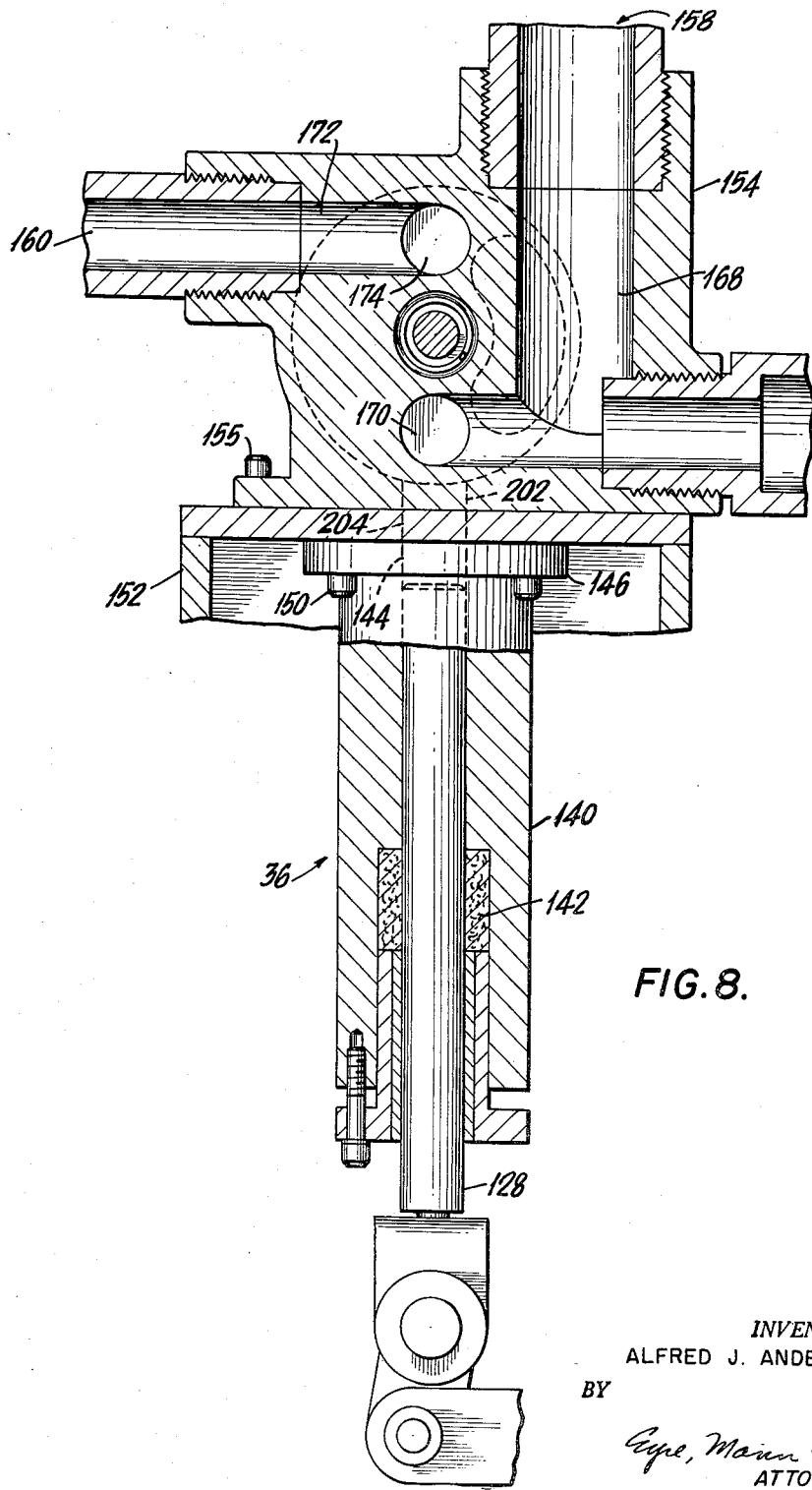
FIG. 8 illustrates a pump and valve control member employed in the apparatus.

As best shown in FIG. 8 the pump comprises a cylinder 140 in which piston rod 128 reciprocates. Packing 142 establishes a seal with piston rod 128 which otherwise makes a sliding fit with the cylinder wall. When the piston moves down in the cylinder it creates a vacuum to draw liquid into the opening 144 at the top of the cylinder and when the piston moves up it forces the liquid out of the opening at the top of the cylinder. Flange 146 provides the means for mounting the pump which is mounted in fixed position by bolts 150 which tightly clamp pump 36 to the bottom surface of a fixed support member 152. A valve member 154 is also clamped to the top surface of the support member by means of bolts 155. Valve member 154 is of unique construction especially devised for use in the structure of the present invention.

Figure 10:
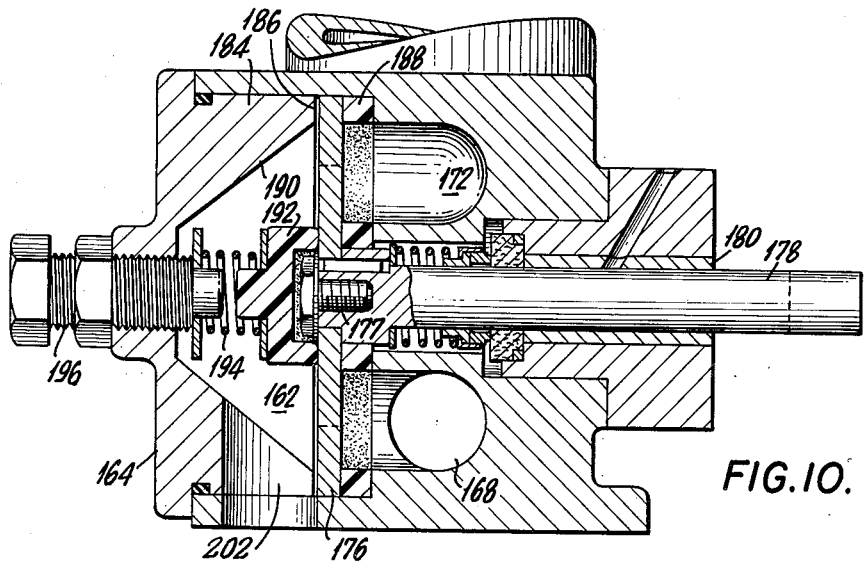
FIG. 10 is taken on line 10—10 of FIG. 9.
Figure 9:
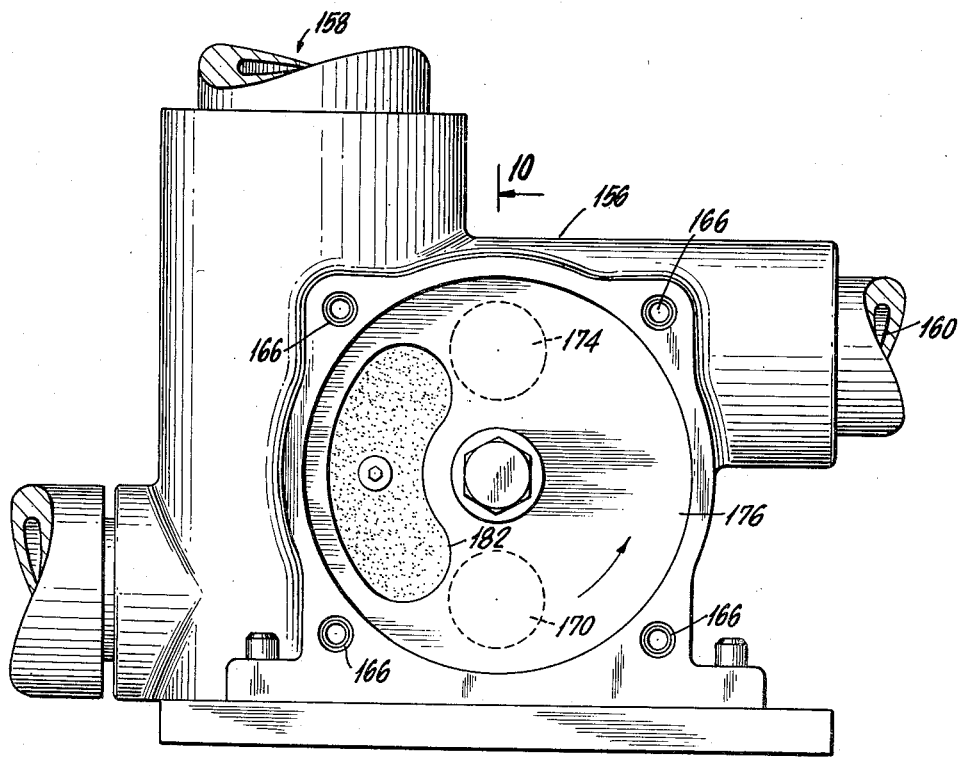
FIG. 9 shows the valve control member of FIG. 8 with the cover plate removed to illustrate construction.

As best shown in FIGS. 8, 9 and 10 valve member 154 comprises a casing 156 having an inlet opening 158 and an outlet opening 160. The casing has a hollow chamber 162 the outside wall of which is formed by a cover plate 164 which is bolted to the casing of the valve member by means of bolts (not shown) which are received in tapped hole 166 of casing 156. Inlet opening 158 is connected to chamber 162 by means of the channel 168 (FIG. 8) which terminates in an inlet valve port 170 which connects the channel with chamber 162. The outlet opening 160 is connected to the chamber by means of channel 172 and the valve port 174. The inlet and outlet valve ports 170 and 174 are positioned 180° apart at the bottom and top of valve chamber 162.

A valve plate 176 is mounted in fixed position by bolt 177 on one end of a shaft 178 which is rotatively mounted in the casing and supported by bearing 180. The valve plate 176 is provided with a generally kidney shaped opening 182 which as the valve plate is rotated by shaft 178 is caused to register with the valve port openings 170 and 174. The kidney shaped opening is made small enough so that it may be positioned between the two valve ports without overlapping either of the valve ports. In such case both the valve ports are sealed shut by the valve plate and no fluid can enter or leave chamber 162 by means of the valve ports.

Cover plate 164 is provided with an annular flange 184 the exterior of which is adapted to make a snug sliding fit with the interior wall of the cylindrical chamber 162. The surface 186 of flange 184 is held in position to provide a small clearance of a few thousandths of an inch between it and the surface of the valve plate. The interior wall 190 of annular flange 184 is in the form of a truncated cone. A pressure member 192 is tensioned against valve plate 176 by means of spring 194 and bolt 196 which is held in threaded engagement in the truncated apex of the cone of the cover member. Pressure of member 192 against valve plate 176 forces the valve plate against the bearing surface 188 of casing 156 to establish a liquid seal between these members so that no fluid will enter or leave chamber 162 when the valve ports 170 and 174 are closed by valve plate 176. Annular flange 184 is provided with an opening or conduit 202 which connects chamber 162 of the valve with the interior of cylinder 140 of the reciprocating pump by means of the opening 204 in support member 152 and opening 144 in flange 146.

Each of the pumps 36, 38 and 40 are provided with a valve member 154 and each valve member is connected to the pump as described above for pump 36. Each valve member is synchronized with the reciprocating action of the piston of the pump. In order to synchronize the valve members with the pumps shaft 178 of the valve members 154 of pumps 36 and 40 are connected by means of a shaft 208 (FIG. 4) and this shaft is in turn connected with a second shaft 210 by means of a chain and sprocket arrangement as at 212. The shaft 210 is mounted at one end in a bearing 214 and the second end of shaft 210 is connected to the shaft 178 of valve member 154 of pump 38. Shaft 210 is connected to the main drive shaft 14 by means of the chain and sprocket 216. As a result shafts 208 and 210 will rotate in step with shaft 14 and rotation of the valve plates 176 of the respective valve members 154 will be timed to the reciprocation of the piston rods of the pumps.

Timing of valve plate 176 to synchronize its rotation with reciprocation of piston 128 is achieved by adjusting the position of valve plate 176 on shaft 178 to locate the kidney shaped opening 182 between the two valve ports 170 and 174 so that when piston 128 of the pump starts its suction stroke by moving downwardly in cylinder 140 the leading edge of the kidney shaped opening (in the direction of rotation) will slide across the inlet valve port 170 to open this port and hold it open during the suction stroke of the piston (see FIG. 9). As a result fluid is sucked into the cylinder of the pump. At the end of the suction stroke of piston 128 the kidney shaped opening will be in position between the valve ports 170 and 174 (FIG. 8) so that both valve ports are again closed. As soon as piston 128 starts its discharge stroke the leading edge of the kidney shaped opening of valve plate 176 moves over the opening of valve port 174 to open the port during the pressure or discharge stroke of piston 128 and fluid is forced out of chamber 162 and discharged through channel 172. At the end of the single revolution of shaft 14 the kidney shaped opening of valve plate 176 will be back in its starting position (FIG. 9) and both of the valve ports will be closed. The valve plates 176 of the valve members 154 of the respective pumps 38 and 40 are synchronized in like manner with valve ports to provide the desired pumping of fluid.

The valve members of the present invention have proven to be particularly effective for controlling the pumping of proportionate amounts of liquids in intermittent flow. Referring to FIG. 1 it will be seen that eccentric 52 is in substantially vertical position when shaft 14 is at rest at the end of a single revolution. When shaft 14 starts to rotate the bottom end of eccentric 52 is at the bottom of its arc and as a result vertical displacement of the end of eccentric 52 for each degree of angular rotation will initially be at a minimum and gradually build up to maximum when the link has rotated through an angle of ninety degrees. As rotation continues the vertical displacement of the end of eccentric 52 for each degree of angular rotation will decrease and again become a minimum when the eccentric has been rotated through one hundred and eighty degrees. Suction of the piston pump is in direct proportion to the vertical displacement of the end of eccentric 52 and the rate of speed at which the circular valve ports 170 and 174 are opened and closed is also correlated to the suction of the piston pumps.

Referring to FIG. 9 it will be seen that the opening of the valve ports 170 and 174 is in the form of a circle and that both the leading and trailing edges of the generally kidney shaped opening in the valve plate are also circular. As a result of this circular construction the rate of speed at which the valve port is opened starts at a minimum for the initial degree of rotation and then it will increase for each successive degree of rotation until the valve port is wide open. The rate of speed at which the valve port is closed starts at a maximum and then it decreases to a minimum until the valve port is fully closed. The synchronization of the opening and closing of the valve ports with the change in speed of vertical displacement of piston 128 is of advantage for controlling the accuracy of the amount of liquid pumped for each revolution of shaft 14.

While the circular opening of the valve ports and the generally kidney shaped opening in the valve plate gives best results holes of other shapes may be employed for synchronizing the opening and closing of the valve ports with the vertical displacement of piston 128. For example triangular shaped openings could be employed or any other configuration may be used for controlling the opening and closing of the valve ports to correlate the size of the opening to the vertical displacement of piston 128.

Another advantage of the valve member of the present invention involves the truncated conical shape of the inside wall 190 of annular flange 184. The gradual slope of the wall tends to direct the pressure and movement of the liquid toward the discharge port 174 and there is no tendency for air pockets to form along the top of the wall (FIG. 10) as might otherwise be the case if chamber 162 was in the form of an ordinary cylinder.

During operation abrasion on the surface of the rotating valve plate 176 will gradually reduce the thickness of the plate and in such case it is only necessary to increase the pressure of spring 194 in order to maintain a fluid seal between the valve plate and wall 188 of chamber 162.

In the preferred form of structure shown in the drawings the inlet opening 158 of the valve member of pump 36 and the inlet opening 158 of the valve member of pump 38 are each connected to an outlet in the bottom of liquid supply tanks 218 and 220 respectively (FIG. 1). The outlet openings 160 of the valve members of pumps 36 and 38 are each connected by means of pipes 222 and 224 to inlet opening of the mixing chamber 42 (FIG. 2). During operation the pumps draw liquid from the supply tanks 218 and 220 and discharge the liquid into mixing chamber 42. The inlet 158 of the valve member of pump 40 (FIG. 16) is connected to the outlet of a liquid supply tank 228 and the outlet opening 160 of the valve member of pump 40 is connected with mixing chamber 42 by means of the pipe 230 (FIG. 2).

Referring now to FIG. 16 it will be seen that piston 128 of pump 40 is connected to end 96 of the walking beam 48. A link 232 is pivotally mounted at the end of walking beam 48 by means of bracket 234 which has the same construction as bracket 98. The distance between the point of connection of link 232 to bracket 234 and the center line of the shaft 50 is equal to the distance between the center line of the shaft and the point of connection of link 100 to bracket 98 (FIG. 1). The second end of link 232 is connected to a pivot arm 236 which is pivotally mounted on a fixed pivot 238. A second link 240 is slidably mounted at one end in slot 242 of pivotal arm 236 by means of a T-bolt 243 (FIG. 6) which is free to slide in slot 242 of the pivotal arm. The T-bolt is held in fixed position at the desired setting in slot 242 by means of a conventional set screw 244 which may be tightened or loosened by means of the hand wheel 245.

The second end of link 240 is connected to one end of a pivotal arm 246 mounted on a fixed pivot 247 and piston 128 is pivotally connected to the second end of arm 246 by means of link 248.

The length of the pivotal arms E, F and G are equal to the length of the pivotal arms A through D (FIG. 1) and the center line of the fixed pivots 238 and 247 coincide with the center lines of the fixed pivots 104 and 124 respectively. As a result of this construction displacement of piston 128 of pump 40 will be in direct proportion to the displacement of the pistons of pumps 36 and 38 since the vertical displacement of end 96 of the walking beam 48 is identical with the vertical displacement of end 94 of walking beam 46. The proportion of the amount of liquid delivered by pump 40 relative to the total amount of liquid delivered by pumps 36 and 38 may be changed by changing the pivotal point of link 240 in the slot of pivotal arm 236. When the pivotal point of link 240 is positioned at the point where link 232 is connected to the pivot arm 236 the displacement of piston 128 will be equal to the combined displacement of the pistons of pumps 36 and 38 when pumps 36, 38 and 40 are all the same size. As a result the amount of liquid delivered by pump 40 will equal the total amount of liquid delivered by pumps 36 and 38. When the pivotal point of link 240 is positioned over the fixed pivot 238 of arm 236 the amount of liquid delivered by pump 40 will be zero.

In the preferred form of structure shown in the drawings supply tanks 218 and 220 may for example be filled with an epoxy base resin and the supply tank 228 for pump 40 is filled with the conventional amine catalyst. If pumps 36, 38 and 40 all have the same capacity pump 40 will deliver one hundred parts of catalyst for each one hundred parts of resin delivered by pumps 36 and 38 when the pivotal point of link 240 is positioned in slot 242 at the point where link 232 is connected to the pivotal arm. When the pivotal point of link 240 is positioned in the middle of arm 236 so that the distance between the pivotal point of link 240 and stationary pivot 238 is equal to the distance between the pivotal point of link 240 and the point of connection of link 232 to the pivotal arm 236 the amount of amine liquid catalyst delivered by pump 40 will be equal to fifty percent of the total amount of liquid resin delivered by pumps 36 and 38. It will be understood that the amounts specified hereinabove refer to volume of liquid delivered by the pumps.

Turning now to FIGS. 11 and 12, the mixing chamber 42 in the preferred form of structure shown is in the form of a cylindrical tank provided with suitable agitation as for example the paddle type agitator 249 (FIG. 11) the shaft 250 of which is driven by an electric motor 251 by means of a conventional belt drive. The liquid from pump 40 passes through pipe 230 into a conventional two-way valve 252 (FIG. 11) which may be conveniently controlled by a handle 253. When handle 253 is set in the solid line position of FIG. 11 the liquid is free to pass through a plug control element 254 into the mixing chamber. When handle 253 is set in the dotted line position the liquid from pump 40 is recycled back to supply tank 228 by means of the pipe 256. Since valve 252 is a conventional type two way valve readily available on the open market the details of its construction will not be described.

The amine catalyst and epoxy base resin are mixed in chamber 42. As is known catalyzed epoxy resins have very short pot life and if the resin should cure and set up in the mixing chamber it is virtually impossible to get the resin out. For this reason the two way valve 252 is important since it is a simple matter to recycle catalyst at the end of a run and then the mixing chamber can be purged with base resin until it is free of catalyzed resin.

In experimental work the inlet to the mixing chamber (FIG. 11) for the amine catalyst would frequently become plugged with cured resin. In order to solve this problem a plastic sleeve 257 is provided in the inlet opening of mixing chamber 42. The plastic material is one which will not adhere to the catalyzed resin employed in the apparatus and in the case of the epoxy resin described in connection with the preferred form of structure I employ a "Teflon" plastic sleeve 257. A steel scraper disc 258 is positioned on top of the Teflon sleeve. The scraper disc 258 is provided with a chamber 260 which is in turn connected to a cylindrical channel 261 of the plug control element by means of holes 262. Channel 261 is connected to one of the outlets 263 of the two way valve 252. A valve stem 264 carried by flange 266 is slidably mounted in channel 261 and the diameter of the valve stem is such that it makes a sliding frictional fit with an opening 267 in the steel scraper disc 258. The valve stem 264 also makes a sliding frictional liquid tight seal with the opening 268 in the Teflon sleeve. The outside diameter of valve stem 264 is smaller than the inside diameter of channel 261. Flange 266 of the valve stem is connected to handle 253 of two way valve 252 by means of the gear rack 270 which is held in meshed engagement with the gear section 274 mounted in fixed position on handle 253. When handle 253 is in the solid line position shown in FIG. 11 the bottom end portion of the valve stem 264 is positioned in hole 267 in the scraper disc. Since the two way valve is set to deliver liquid to the mixing chamber the amine catalyst is free to flow through channel 261, holes 262, chamber 260 and then through the opening 268 in the Teflon sleeve and into the mixing chamber. When handle 253 is in the dotted line position shown in FIG. 11 the two way valve is set to recycle catalyst back to the supply tank and valve stem 264 is forced down into the opening 268 of the sleeve which is thereby sealed so no liquid can flow into the opening 268. The valve stem 264 is made long enough so that the tip of the stem will project through the opening 270 in the mixing chamber when handle 253 is in the dotted line position shown in FIG. 11. However, valve stem 264 tends to pick up a thin film of catalyzed resin. This film of resin is scraped off the exterior of the valve stem each time that handle 253 is moved into the solid line position of FIG. 11 by means of the steel scraper disc 258. The material scraped off accumulates in chamber 260 and thereafter the liquid amine catalyst passing through holes 262 will flush the scraping out of the chamber and carry it into mixing chamber 42. This cleaning of the valve stem 264 is highly effective for preventing a build up of catalyzed resin on the valve stem which might otherwise freeze the valve and interfere with operation. The plug control element 254 is mounted in position over the inlet to the mixing chamber by conventional means (not shown) and suitable packing 276 is employed to provide a liquid tight seal.

The catalyzed resin is dispensed through an outlet pipe 282 (FIG. 12) positioned in the bottom of the mixing chamber. A cut off 284 insures a clean cut off of the flow of catalized resin without drops. When shaft 14 rotates the cut off is open and when shaft 14 ceases to rotate cut off 284 is closed. A preferred form of cut off especially adapted for use with epoxy resins is shown in the drawings. The cut off comprises a Tygon plastic sleeve 286 which projects down below the outlet pipe 282 and a pinching device 288 which includes a pair of arms 290 and 292 mounted on a fixed pivot 294 to operate like a pair of shears. One end of each arm is connected to a rod 296 of a conventional solenoid 298 by means of the links 300 and 302 respectively. The solenoid 298 is actuated electrically by a microswitch 304 which is controlled by a cam 306 mounted on shaft 14 (FIGS. 3 and 14). When shaft 14 is at rest the microswitch is closed and the pinch arms 290 and 292 are closed against the tube to pinch it shut. When shaft 14 starts to rotate cam 306 opens the microswitch to open the electric circuit and a spring 307 causes the arm 296 to move to the left (FIG. 13) and spread the pinch arms to open the tube so that liquid resin may be dispensed. The tube is opened as pumping starts and it remains open until shaft 14 ceases its rotation whereupon the microswitch is closed to actuate solenoid 298 which causes arm 296 to move to the right (FIG. 13) so that arms 290 and 292 pinch the tube close. If desired a separate electrical switch (not shown) in addition to microswitch 304 may be employed to control the pinch arms 290 and 292 independently of the microswitch.

The present apparatus in operation has proven to be most effective for metering, mixing and dispensing proportionate amounts of two or more different liquids. The preferred form of apparatus described is particularly effective for mixing three different components such as a specified amount of catalyst with proportionate amounts of two epoxy base resins of different viscosities. The two epoxy base resins to be mixed are each stored in one of the supply tanks 218 and 220 and the liquid amine catalyst is stored in tank 228. For each single revolution of shaft 14, proportionate amounts of all three liquids are delivered simultaneously into mixing chamber 42 where the liquids are blended and mixed. The broad range of the proportions of liquids and the total amount of catalized liquid resin to be dispensed from mixing chamber 42 is determined by the relative size of the pistons in the pumps for a given displacement during reciprocation. For example in experimental work the size of the pistons of the pumps 36 and 38 was five eighths of an inch while the size of the piston of pump 40 for the catalyst in tank 228 was seven sixteenths. With pistons of this size the total amount of catalized resin dispensed from mixing chamber 42 ranged from zero to thirty five mls. The proportion of catalyst to resin was from zero to forty parts for each one hundred parts of epoxy base resin pumped to chamber 42 from the supply tanks.

In one experimental run slide bar 168 was set so that ten mls. of epoxy base resin was supplied by pump 36 to mixing chamber 42 for each single revolution of drive shaft 14 and twelve mls. of epoxy base resin was supplied by pump 38. The pivotal point of link 240 in arm 236 was set so that about four mls. of catalyst was supplied to the mixing chamber by pump 40 for each revolution of shaft 14. The total range of amount of liquid (both resin and catalyst) was from about one half ml. of 26 mls. In order to vary the total amount of liquid delivered for each revolution of shaft 14 within the specified range it is only necessary to change the position of the pivotal points of the reciprocating arms 46 and 48 by moving shaft 50. Throughout the range it was found that the proportion of the three different liquids in the total delivered did not vary more than about 1.2%. In the preferred form of structure described all three pumps deliver liquid simultaneously but the flow of the liquids is interrupted while the pistons of pumps 36, 38 and 40 are on the suction stroke.

In some cases it may be desirable to deliver both catalyst and epoxy base resin to mixing chamber 42 continuously without interruption. In such case pumps 36 and 38 are connected to the walking beam 46 as illustrated in FIG. 15. As there shown link 100 is connected to one end of pivot arm 308 which is mounted on the fixed pivot 310. The second end of pivot arm 308 is connected to a second pivot arm 312 by means of a link 314. The pivotal arm 312 is mounted on a fixed pivot 316 and one end of the pivot arm 312 is connected to piston 128 of pump 36 by means of a link 318. The second end of pivot arm 312 is connected to the piston 128 of pump 38 by means of a link 320.

For continuous delivery of catalyst a second catalyst supply tank and pump are employed which cooperate with supply tank 228 and pump 40 for supplying catalyst to mixing tank 42. The second supply tank and pump for the catalyst are illustrated in FIG. 17. As there shown link 232 of pump 40 is connected to a pivot arm 334 which is mounted on a fixed pivot 336. One end of the pivot arm 334 is provided with a slot 338 which slidably mounts a T-bolt 340. T-bolt 340 connects this end of the pivot arm with a second pivot arm 342 by means of link 343. The second pivot arm is mounted on a fixed pivot 344 and one end of the arm is connected to piston 128 of pump 40 by means of link 345. The second end of pivot arm 342 is connected to piston 128 of pump 348 by means of a link 350. Pump 348 has the usual valve member 154 which controls the flow of amine catalyst from a supply tank 352. The supply tank 352, valve member 154 and pump 348 are identical to pump 36, its valve member and supply tank and these members are assembled in the structure in the same manner as previously described for pump 36, its valve member and supply tank. In this modified form of structure it will be understood that valve member 154 of pump 348 takes the place of bearing 214 shown in FIG. 4 and the shaft 178 of valve member 154 of pump 348 is connected to the shaft 210. As a result resin pump 38 and catalyst pump 348 form a pair identical to the pair of resin pump 36 and catalyst pump 40. The pumps are so arranged so that when the pistons of pumps 36 and 40 are on suction stroke the pistons of pumps 38 and 348 are on discharge so that the flow of liquid to mixing tank 42 is continuous. The liquid catalyst is supplied from pump 348 through pipe 354 which feeds the catalyst through a two way valve (not shown) and a plug control (not shown) into mixing chamber 42. The two way valve and plug control for pipe 354 are identical to two way valve 252 and plug control 254.

In the structure shown the pivotal arms 308 and 312 are the same length as the pivotal arms 334 and 342. In all cases of pivotal arms 308, 312, 334 and 342 the fixed pivot is located in the middle of the arms and the center line of pivot 310 coincides with the center line of pivot 336 and the center line of pivot 316 also coincides with the center line of pivot 344.

In the form of structure illustrated in FIGS. 15 and 17 when pump 36 and its catalyst pump 40 are delivering liquid to mixing chamber 42 the pumps 38 and 348 are on the suction stroke and when pumps 36 and 40 are on the suction stroke and filling pumps 38 and 348 are delivering liquid to mixing chamber 42. As a result the pumping of both epoxy resin and amine catalyst is continuous. As distinguished from this in the form of structure shown in FIGS. 1 and 2 all three of the pumps 36, 38 and 40 are simultaneously on the suction stroke and the supply of epoxy resin and amine catalyst to mixing chamber 42 is intermittent. In the structure shown in FIGS. 1 and 2 the proportion of the amounts of any one of the three liquids may be varied and as a result if desired an epoxy base resin of one viscosity may be employed in supply tank 218 and an epoxy base resin of different viscosity may be employed in supply tank 220. Since the pumps 36 and 38 deliver two different viscosity epoxy base resins at the same time they are instantly mixed as the base resins enter the mixing chamber.

In the structure of FIGS. 15 and 17 the proportion of liquid catalyst and epoxy base resin is controlled by the position of the T-bolt 340 in slot 338 of pivotal arm 334. As in the case of T-bolt and handwheel 243 of FIG. 16 the T-bolt 340 may be locked in any desired position in slot 338 by means of a conventional set screw (not shown).

In some cases it may prove desirable to employ a two component system comprising a single epoxy base resin and a liquid amine catalyst for such resin. In such case the liquid amine catalyst is supplied to the mixing chamber with the structure shown in FIG. 16. A single supply tank is employed for the epoxy base resin such as the supply tank 218 shown in FIG. 1. The connection of pump 36 to supply tank 218 and to the walking beam 46 is identical with that illustrated in FIG. 1 with the exception that a simplified form of pivot arm 355 is employed in place of pivot arm 102 shown in FIG. 1.

The construction is shown in FIG. 18 and as there shown the pivot arm 355 is mounted on the fixed pivot 104 and the links 120 and 100 are both connected to a common pivot point on one end of the arm. The length of pivot arms 355 between the fixed pivot 104 and the connection of links 120 and 100 is equal to the length of pivot arm E of FIG. 16. The center line of fixed pivot 104 coincides with the center line of fixed pivot 238 (FIG. 16). With this form of structure the amount of amine catalyst is adjustable from zero up to 100 parts of liquid catalyst for each 100 parts of epoxy base resin in the case where the capacity of the two pumps 36 and 40 are the same. Once the proportion of amine catalyst to epoxy base resin has been established the position of shaft 50 may be changed in the slots of the walking beams 46 and 48 in order to change the total volume of liquids delivered to mixing chamber 42.

While the preferred form of structure described employs reciprocating pumps it will be understood that one or more rotary pumps may be used in place of such reciprocating pumps. In such case the rotary pumps may be connected to the reciprocating drive as described in United States Letters Patent No. 2,895,644, issued July 21, 1959.

Figures 19, 20:
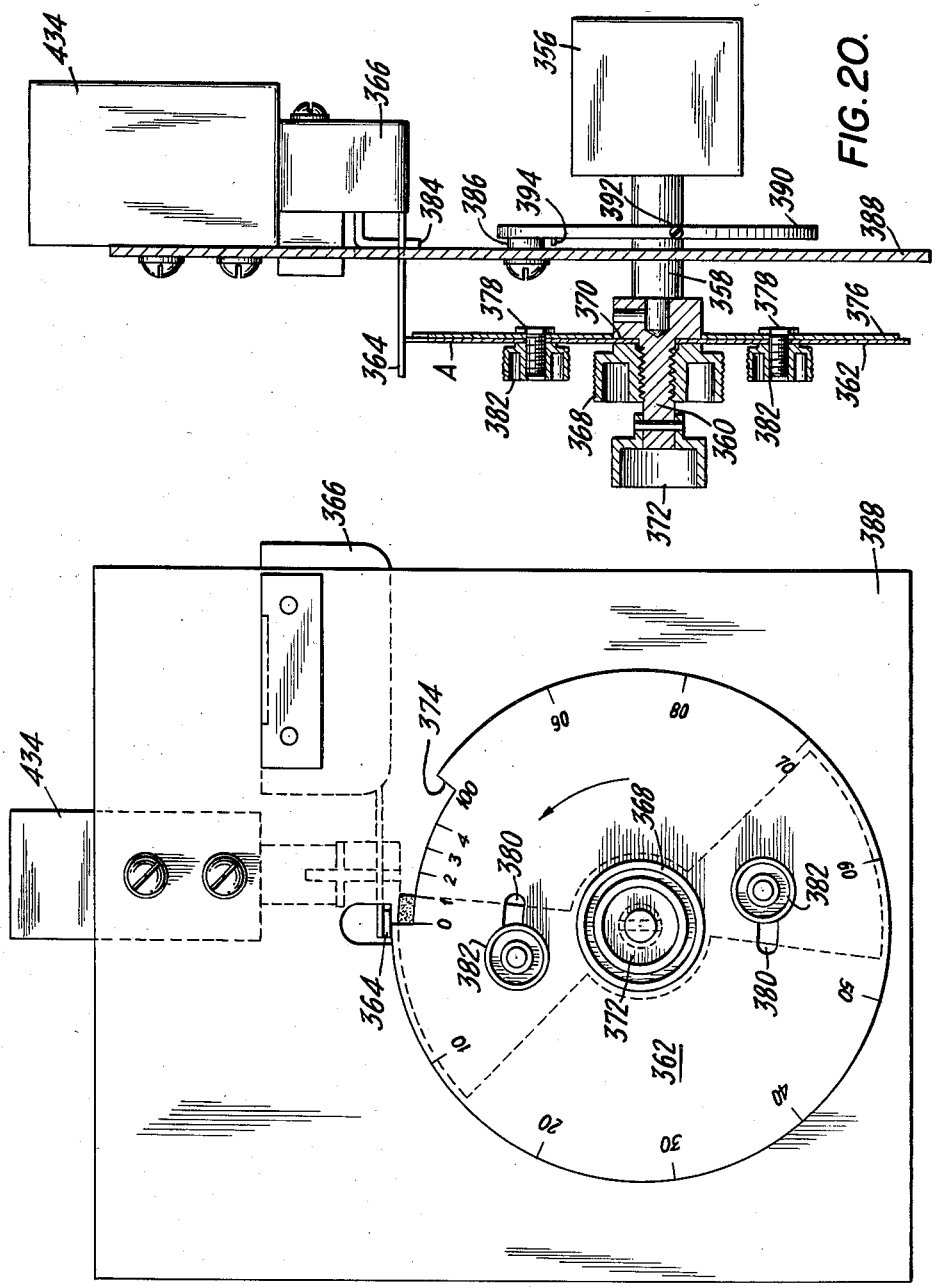
FIGS. 19 through 21 illustrate a timing device for controlling pot life of catalyzed resin in the mixing chamber.
Figure 21:
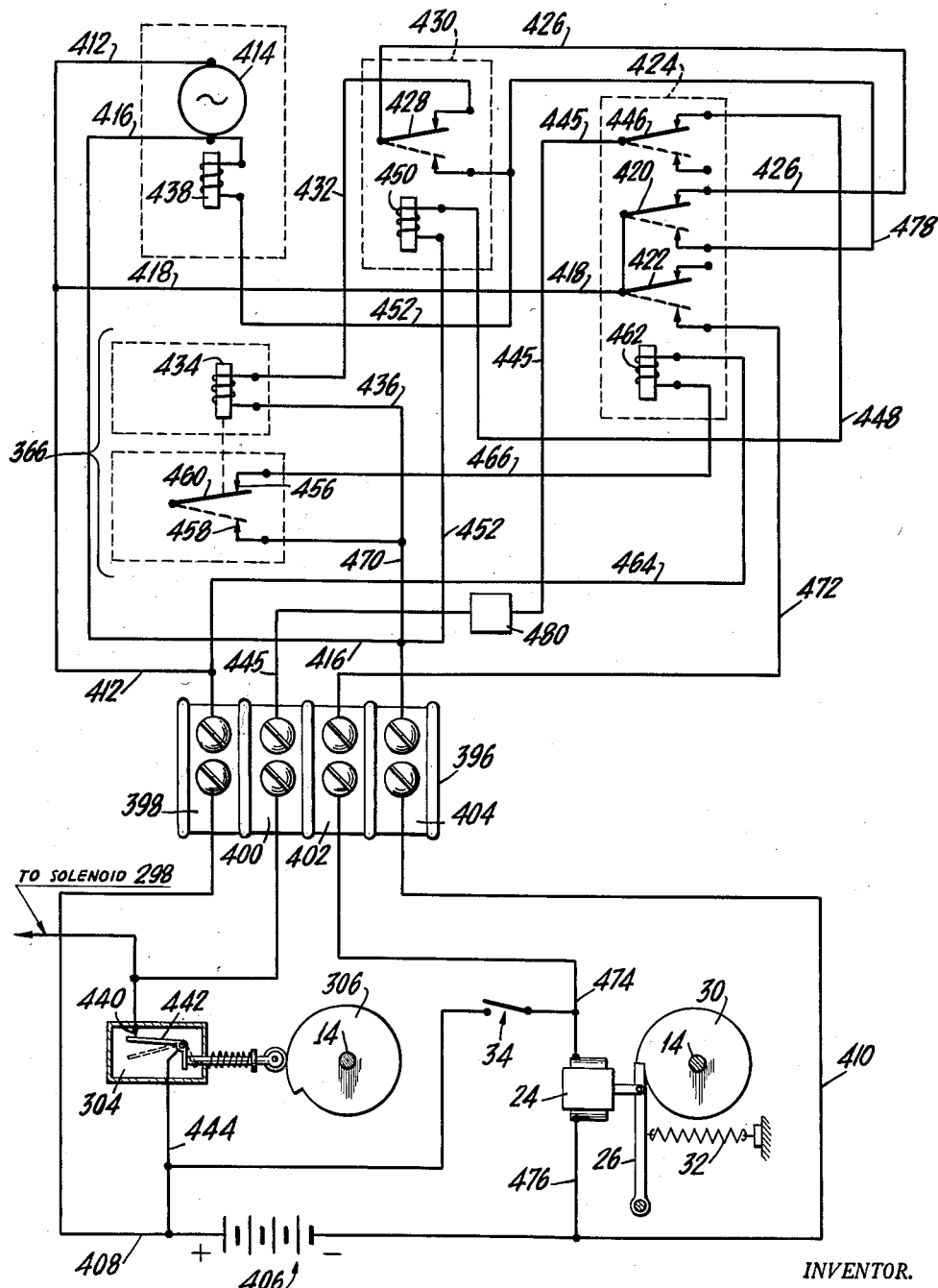

Pot life of catalyzed resin in mixing chamber 42 is controlled by means of the timing device shown in FIGS. 19 through 21. Referring to FIGS. 19 and 20 the device comprises a conventional electric timing clock 356 purchased on the open market which is provided with a clutch which, when engaged, causes a shaft 358 to rotate in counterclockwise direction (FIG. 19) in step with the clock motor. A hub 360 is mounted in fixed position on shaft 358 and a timing control element preferably in the form of a dial 362 is rotatively mounted on the hub. The face of the dial is marked off in equal increments from zero to one hundred which in the structure shown corresponds to a fifteen minute period of time. A contact arm 364 which controls a conventional make before break switch assembly 366 is held in position to bear against the periphery of the dial.

In order to set the timer for a fifteen minute cycle dial 362 is rotated in clockwise direction (FIG. 19) on hub 360 until arm 364 is positioned over the one hundred mark on the dial. The dial is then locked in fixed position on hub 360 by tightening a locking nut 368 which is threaded on shaft 358. The locking nut clamps the dial against the annular shoulder 370 of the hub 360. Knob 372 is mounted in fixed position on hub 360 so that the dial may be rotated by hand. After the one hundred mark of dial 362 is set under contact arm 364 the clutch of the motor of clock 356 is engaged and dial 362 will then rotate in counterclockwise direction (FIG. 19). Arm 364 will ride on the periphery of the dial until the arm reaches the zero point on the dial.

The peripheral edge of the dial is cut out between the zero and one hundred mark to provide a cam in the form of a notch 374. A plate 376 preferably in the form of two opposing circle segments which counter balance each other is mounted on the rear of dial 362 by means of a pair of threaded pins 378 which are each mounted in fixed position on plate 376 to project through the slots 380 in dial 362. Knurled locking nuts 382 are tightened on pins 378 to hold plate 376 in the desired position relative to dial 362. The edge of dial 362 at the bottom of notch 374 is marked off in convenient equal increments of time. Plate 276 is set by rotating the plate until one side edge is positioned in line with the desired time increment. The peripheral edge of plate 376 is held in position in notch 374 below the level of the peripheral edge of dial 362 so that when arm 364 passes the zero point on dial 362 the arm will drop down in notch 374 against the peripheral edge of plate 376 upon continued rotation of dial 362. When arm 364 contacts the peripheral edge of plate 376 it causes a switch arm (later described) in switch 366 to close and this automatically causes shaft 14 to rotate and pump fresh resin and catalyst into the mixing chamber 42 to purge the chamber of catalyzed resin which would otherwise harden and plug the mixing chamber.

In the form of structure shown in the drawings the mixing chamber holds about 40 mls. of catalyzed resin having a pot life of approximately fifteen minutes. In order to purge the chamber, shaft 14 is preferably timed to run for about ten seconds for each fifteen minutes that the pump is inoperative. The setting of plate 376 in notch 374 determines the purge time.

When arm 364 reaches the edge of plate 376 it drops down off the plate against the edge of dial 362 in the bottom of notch 374 and in so doing the arm causes a pair of contacts in switch 366 to open. Thereupon arm 364 is lifted up above the level of the periphery of dial 362 by means of a pull type solenoid actuated lever 384 and the clutch of the time clock is disengaged from shaft 358 by electrical means later described. An ordinary coil spring (not shown) in the clock mechanism 356 attached to shaft 358 is tightened as the shaft rotates in counterclockwise direction and when the clutch is disengaged this spring uncoils and thereby rotates shaft 358 in clockwise direction (FIG. 19) automatically to return the dial to its initial starting position with the one hundred mark under arm 364. A fixed stop 386 and a circular plate 390 mounted in fixed position on shaft 358 by means of a set screw 392 is provided with a pin 394 which is adapted to contact the stop. The plate 390 is so arranged on shaft 358 relative to the stop that pin 394 will contact the stop and prevent further rotation of dial 362 when the one hundred mark on the dial is positioned under arm 364.

If the timer dial is to be set for a seven and one-half minute pot life, it is only necessary to loosen lock nut 368 and rotate the dial relative to hub 358 until the fifty mark on the dial is set under arm 364. The purge time during which the shaft 14 rotates is determined by the position of the side edge of plate 376 in notch 374. In this connection it will be understood that slots 380 are arranged so that arm 364 will always have room to drop off the periphery of plate 376 and contact the edge of dial 362 in the bottom of notch 374.

It will be understood that the electric clock, its clutch and the coiled spring constitute a conventional clock timer available on the open market and as such this unit does not constitute any part of the present invention. If a timing cycle of one half hour is desired it is only necessary to change the ratio of the gears that connect the clock motor with shaft 358 in conventional manner.

The electric circuit of the present invention for controlling operation of the pot life timer is illustrated in FIG. 21. As there shown a terminal board 396 is provided with four terminals 398, 400, 402 and 404 respectively.

One side of terminal 398 is connected to a suitable source of power supply 406 by connector 408 and one side of terminal 404 is connected to the second side of the source of power 406 by means of connector 410 to complete the circuit. Current is fed from the second side of terminal 398 through connector 412 to the motor 414 of the clock timer 356. Current flows from the clock motor through connector 416 back to the second side of terminal 404 to complete the circuit. When a master switch (not shown) is closed in order to operate the proportioning apparatus current is continuously supplied to the clock motor 414 and while the master switch remains closed the motor operates continuously. Current supplied through connector 412 branches off into connector 418 which feeds the current into the switch arms 420 and 422 of the three pole double throw switch 424. Conductor 426 feeds the current from switch arm 420 into the switch arm 428 of the single pole double throw switch 430. Conductor 432 feeds the current into the windings of a pull type solenoid 434 and the circuit is completed by conductor 436 which feeds the current into the second side of terminal 404. The pull type solenoid is thereby energized and it is this solenoid which controls lever 384 so that when the solenoid is energized the lever is up and arm contact 364 is lifted up and held above the level of the periphery of dial 362. At this time the clutch 438 of the clock is disengaged so that the dial 362 is free to rotate in clockwise direction (FIG. 19) under the influence of the coiled spring (not shown) and as a result the dial is reset to bring the one hundred mark under arm 364 as previously described.

One side of terminal 400 is connected to a contact 440 in the microswitch 304 (see FIGS. 14 and 21) and the switch arm 442 of microswitch 304 is connected to the one side of the source of power 406 by means of the connector 444. When cam 306 is in the position shown in FIGS. 14 and 21 shaft 14 is not rotating and switch arm 442 is closed against contact 440. As a result current is fed from the second side of terminal 400 through the connector 445 to the switch arm 446 of the three pole double throw switch assembly 424 and the current from switch arm 446 is fed by means of connector 448 to the relay 450 and back to the second side of terminal 404 by connector 452. As a result relay 450 is energized and the energized relay causes switch arm 428 to move into the dotted line position. This interrupts the supply of current through conductor 432 to the pull type solenoid 434 so that the solenoid is deenergized. As a result of deenergizing solenoid 434 arm 364 is released and it drops down under the influence of gravity to bear against the periphery of dial 362.

In addition switch arm 428 (when in the dotted line position) supplies current to the clutch 438 of the clock of the timer by means of the connector 452. As a result clutch 438 is engaged to cause shaft 358 and dial 362 to rotate in counterclockwise direction. The circuit through clutch 438 is completed through connector 416. Since switch arm 442 is held away from contact 440 by cam 306 when shaft 14 is rotating dial 362 under the influence of the coiled spring (not shown) will reset itself for a timing cycle as previously described but once shaft 14 stops rotating switch arm 442 will immediately move into the solid line position to start a timing cycle as described hereinabove.

Arm 364 controls the switch arms in a conventional make before break type switch assembly 366. The switch assembly is available on the open market. The make before break switch 366 is provided with two switch arms both of which are held in position against a contact 456 when arm 364 is in position against the periphery of dial 362. When arm 364 drops off the periphery of dial 362 into the notch 374 and against the periphery of plate 376 one of the switch arms 458 of the make before break switch 454 drops down into the dotted line position but the second switch arm 460 remains in position against the contact 456. As a result the circuit is closed through relay 462 by means of conductors 464 and 466, the switch arms 460 and 458 and conductor 470. When relay 462 is energized switch arms 420, 422 and 446 of the three pole double throw switch 424 are each caused to move into the dotted line position. As a result shaft 14 of the proportioning apparatus is caused to rotate and both amine catalyst and epoxy base resin are then fed into the mixing chamber to displace the catalyzed resin therein which at this time is near the end of its pot life. The catalyzed resin is dispersed from the mixing chamber as previously described hereinabove before.

For this purging operation current is fed through conductor 418, switch arm 422, conductor 472 and into one side of the terminal 402. The second side of terminal 402 is connected to solenoid 24 (FIGS. 5 and 21) by means of the conductor 476. The circuit through conductors 474 and 476 bypass the manually controlled switch 34 so that the single revolution clutch will operate to rotate shaft 14 even though switch 34 is open. Since current is continuously supplied by conductors 474 and 476 through the solenoid 24 shaft 14 will rotate continuously as long as current is supplied by these conductors.

In causing switch arm 446 to move into the dotted line position relay 462 thereby breaks the circuit through conductor 448 to relay 450 which is thereupon deenergized and as a result switch arm 428 moves back into the solid line position shown in the drawing. Operation of clutch 438 is not, however, interrupted since the switch arm 420 is in the dotted line position so that it supplies the current for operating the clutch of the timer motor through the conductor 478. Pumping of liquids to the mixing chamber 42 continues until arm 364 drops down off the periphery of plate 376 against the edge of dial 362 in notch 374. As a result switch arm 460 is caused to drop down into the dotted line position of switch arm 458 which interrupts the circuit through relay 462. The relay is thereby deenergized and the switch arms 420, 422 and 446 return to the solid line position shown in the drawings. This stops purging rotation of shaft 14 and causes current to be fed to switch arm 428 which is in the solid line position so that the pull type solenoid 434 is energized to lift arm 364 above the level of the periphery of dial 362. It also interrupts the supply of current to clutch 438 which is thereupon disengaged so that the dial will rotate in clockwise direction (FIG. 19) under the influence of the coiled spring until the one hundred mark is again in position under arm 364. This resets the timer so that it may repeat its timing cycle.

The circuit described for controlling the purging of chamber 42 has in operation proven to be extremely effective. However, it is conceivable that at the time purging is interrupted the arm 26 controlled by solenoid 24 could be in just the right position to engage the notch 28 of cam 30 (FIG. 5) of the single revolution clutch and thereby immediately interrupt rotation of shaft 14. In such case switch arm 442 would be closed against contact 440 which would interrupt resetting of dial 362 since clutch 438 would be engaged for a timing cycle. As a result switch arm 364 would almost immediately again drop down into notch 374 against the periphery of plate 376 to start shaft 14 and give additional purging. While this is not particularly objectionable, if desired a conventional time delay switch 480 may be installed in conductor 445 so that the circuit from switch arm 442 through relay 450 will be held open by the time delay switch for a second or two in order to give dial 362 opportunity to reset itself under the influence of the coiled spring.

During normal operation of the proportioning apparatus current is supplied through conductor 452 to the relay 450 whenever switch arm 442 is closed against contact 440. This as previously described will cause the clutch of the timer motor 414 to engage and start a timing cycle. Assuming for the moment that switch 34 is closed in order to pump and dispense liquid from mixing chamber 42 while contact arm 364 is traveling along the periphery of dial 362.

When this is done the dial 362 will automatically reset itself to start another timing cycle. Interruption of current to conductor 445 will deenergize relay 450 so that switch arm 428 will return to the solid line position. When this occurs the current to clutch 438 through conductor 452 is interrupted and as a result the clutch is disengaged. At the same time current from conductor 418 will pass through switch arm 420, conductors 426 and 432 to again engage the pull type solenoid 434 to lift contact arm 364 off the periphery of dial 362 which thereupon automatically resets itself under the influence of the coiled spring.

It will be understood that the timing device of the present invention may be employed in connection with apparatus other than the proportioning apparatus shown in the drawings and any desirable form of timing control element for actuating contact arm 364 may be employed.

It will be further understood that it is intended to cover all changes and modifications of the preferred form of invention herein chosen for the purpose of illustration which do not constitute departures from the spirit and scope of the invention.

What is claimed is:

1. A proportioning apparatus which comprises a mixing chamber, a first feed system for supplying one liquid to said mixing chamber, a pump in said first feed system, a walking beam for driving said pump, a movable support for said beam, said beam being pivotally mounted on said movable support, drive means separate from said support to drive the walking beam with reciprocating motion to pivot on said movable support, a second feed system for supplying a second liquid to said mixing chamber, a second pump in said second feed system, a second walking beam for driving said second pump, a second movable support for said second beam, said second beam being pivotally mounted on said second movable support, drive means separate from said second support for driving the said second walking beam with reciprocating motion to pivot on said second movable support, means for interlocking said two supports adapted to move the two supports simultaneously lengthwise along said beams whereby by changing the position of the moving supports the amount of liquid delivered by each pump to the mixing chamber may be changed without substantial change in the proportion of each liquid delivered to the mixing chamber.

2. A structure as specified in claim 1 in which the means for driving the two beams include a shaft, means for rotatively mounting said shaft, a single source of power for driving such shaft, excentric means connected to said shaft for transmitting the drive of the shaft to the said two beams.

3. A structure as specified in claim 1 which includes a valve member positioned in each of said feed systems for controlling the flow of liquid to the said mixing chamber and which includes a discharge valve for controlling the dispensing of liquid from the said mixing chamber and means for interlocking all of said valves adapted to open the said discharge valve to dispense liquid when both of the control valves in the feed system are open and to close the discharge valve when both of the control valves in the system are closed.

4. A structure as specified in claim 1 which includes a timer device for measuring the pot life of liquid in the mixing chamber, said timer device including means for actuating both of said feed systems to cause both of said two liquids to be fed to the mixing chamber to displace liquid therein.

5. A proportioning apparatus which comprises a plurality of pumps, a mixing chamber with discharge pipe, means for connecting the discharge of said pumps with the mixing chamber, a valve positioned in the discharge pipe of the mixing chamber, means for actuating the valve adapted to open the valve for dispensing liquid when liquid is being delivered to said mixing chamber and to close the valve when no liquid is being delivered to said chamber, driving means for operating the said pumps which include a drive shaft, means for driving such shaft, a second shaft positioned substantially parallel to said drive shaft, at least two arms pivotally mounted on said second shaft for driving the pumps and means for changing the position of said second shaft relative to the pivotal points of said arms and position of the first mentioned drive shaft whereby the total amount of liquid delivered to the mixing chamber by the pumps may be changed by changing the position of said second shaft.

6. In a proportioning apparatus of the type adapted to mix proportionate amounts of two liquids and to deliver measured quantities of the liquid mixture the combination which comprises a plurality of pumps, a single walking beam for driving the pumps, a movable support for said beam, said beam being pivotally mounted on said movable support, drive means separate from said support to drive the walking beam with reciprocating motion to pivot on said movable support, means for moving the support lengthwise along said arm whereby by changing the position of the movable support the total amount of liquid delivered by each pump to the mixing chamber may be changed without substantially changing the proportion of each liquid.

7. A proportioning apparatus for mixing a plurality of liquids, a mixing chamber, at least two feed systems for supplying measured quantities of each liquid to the mixing chamber, a pump in each of said feed systems, a walking beam for each of said pumps, a movable support for each beam, said beams being pivotally mounted on said movable supports, drive means separate from said supports to drive the walking beams with reciprocating motion to pivot on said movable supports, a pivotal arm mounted on each walking beam, means for interlocking the moving supports in said feed systems which is adapted to move the two supports lengthwise along said arms simultaneously whereby by changing the position of the moving supports the amount of liquid delivered by each pump to the mixing chamber may be changed without substantial change in the proportion of each liquid, and separate adjustable means for transmitting the drive of each of said two pivotal beams to the pumps in each feed system whereby by changing the setting of the said adjustable means the proportion of the liquid delivered by each pump may be varied.

8. A proportioning apparatus for mixing a plurality of liquids which comprises a mixing chamber with an input and an output, a first feed system for supplying liquid to the input of said chamber, a second feed system for supplying a second liquid to the input of said chamber, agitating means in said mixing chamber between the input and output of said chamber to mix said first and second liquids together, a valve member at said output of said chamber for controlling the discharge of liquid from said mixing chamber, means for causing the liquid to flow in said feed systems, a valve member in each feed system for controlling the flow of liquid to said mixing chamber and electric means for interlocking the discharge valve of said mixing chamber with both of the control valves in said feed systems, said means being adapted to open the discharge valve when either one of said control valves in the feed system are open and to close the discharge valve when both of said valves in the feed system are closed.

9. A proportioning apparatus which comprises a mixing chamber, a first feed system for delivering liquid to said mixing chamber, a second feed system for delivering a second liquid to said mixing chamber, a pump in each of said feed systems, a walking beam for driving each of said pumps, means for connecting each of said beams with one of said pumps, a pair of movable pivots each of which pivotally mount one of said beams, means for interlocking the pair of movable pivots adapted to move the two pivots simultaneously lengthwise along the beams whereby the total amount of liquid delivered to the mixing chamber may be changed by changing the position of the moving pivots of the two beams and means for driving the two walking beams, in which the means for interlocking the movable pivots of each of said beams comprises a shaft, means for pivotally mounting the two beams on said shaft and means for moving the shaft along the length of said beams.

10. A proportioning apparatus which comprises a mixing chamber, a first feed system for delivering liquid to said mixing chamber, a second feed system for delivering a second liquid to said mixing chamber, a pump in each of said feed systems, a walking beam for driving each of said pumps, means for connecting each of said beams with one of said pumps, a pair of movable pivots each of which pivotally mount one of said beams, means for interlocking the pair of movable pivots adapted to move the two pivots simultaneously lengthwise along the beams whereby the total amount of liquid delivered to the mixing chamber may be changed by changing the position of the moving pivots of the two beams and means for driving the two walking beams, and in which the means for driving the two beams include a shaft, means for rotatively mounting said shaft, a single source of power for driving such shaft, excentric means connected to said shaft for transmitting the drive of the shaft to the said two beams, and in which the means for interlocking the movable pivots of each of said beams comprises a second shaft positioned substantially parallel to said driving shaft, means for pivotally mounting each of said beams on said second shaft and means for moving the shaft relative to the length of the said beams in which the means for interlocking the movable pivots of each of said beams comprises a second shaft positioned substantially parallel to said driving shaft, means for pivotally mounting each of said beams on said second shaft and means for moving the shaft relative to the length of the said beams.

11. A proportioning apparatus which comprises a mixing chamber, a first feed system for delivering liquid to said mixing chamber, a second feed system for delivering a second liquid to said mixing chamber, a pump in each of said feed systems, a walking beam for driving each of said pumps, means for connecting each of said beams with one of said pumps, a pair of movable pivots each of which pivotally mount one of said beams, means for interlocking the pair of movable pivots adapted to move the two pivots simultaneously lengthwise along the beams whereby the total amount of liquid delivered to the mixing chamber may be changed by changing the position of the moving pivots of the two beams and means for driving the two walking beams, an inlet opening in said mixing chamber which is connected to one of said feed systems by means of a conduit having a cross sectional area greater than that of the said inlet opening, a rod slidably mounted in said conduit, said rod having an end portion adapted to snugly fit into the said inlet opening and seal it shut against the flow of liquid whereby when the said rod is removed from said inlet opening the liquid will be free to flow into the mixing chamber and means for sliding the rod in said conduit to open and close the inlet opening in the mixing chamber.

12. A proportioning apparatus which comprises a mixing chamber, a first feed system for delivering liquid to said mixing chamber, a second feed system for delivering a second liquid to said mixing chamber, a pump in each of said feed systems, a walking beam for driving each of said pumps, means for connecting each of said beams with one of said pumps, a pair of movable pivots each of which pivotally mount one of said beams, means for interlocking the pair of movable pivots adapted to move the two pivots simultaneously lengthwise along the beams whereby the total amount of liquid delivered to the mixing chamber may be changed by changing the position of the moving pivots of the two beams and means for driving the two walking beams, each of the means for connecting each of said walking beams with said pumps include a pivotal arm mounted on a fixed pivot, a link for connecting each of said pivotal arms with each of said pumps, means for slidably mounting said links on each of said pivotal arms whereby the said link may be moved lengthwise along the said pivotal arms to transmit a portion of the drive of said walking beams to the said pumps each of the means for connecting each of said walking beams with said pumps include a pivotal arm mounted on a fixed pivot, a link for connecting each of said pivotal arms with each of said pumps, means for slidably mounting said links on each of said pivotal arms whereby the said link may be moved lengthwise along the said pivotal arms to transmit a portion of the drive of said walking beams to the said pumps.

13. A proportioning apparatus which comprises a mixing chamber, a first feed system for delivering liquid to said mixing chamber, a second feed system for delivering a second liquid to said mixing chamber, a pump in each of said feed systems, a walking beam for driving each of said pumps, means for connecting each of said beams with one of said pumps, a pair of movable pivots each of which pivotally mounts one of said beams, means for interlocking the pair of movable pivots adapted to move the two pivots simultaneously lengthwise along the beams whereby the total amount of liquid delivered to the mixing chamber may be changed by changing the position of the moving pivots of the two beams and means for driving the two walking beams, and in which the means for driving the two beams include a shaft, means for rotatively mounting said shaft, a single source of power for driving such shaft, excentric means connected to said shaft for transmitting the drive of the shaft to the said two beams, the eccentric means for connecting the said drive shaft to said walking beams include an arm mounted in fixed position on said drive shaft to rotate therewith and sliding means for connecting the walking beam to the said fixed arm on the shaft whereby the point of connection of the said beam with the said fixed arm may be changed to transmit a proportion of the drive of the shaft to said walking beam.

14. A proportioning apparatus for moxing a plurality of liquids which comprises a mixing chamber, a first feed system for supplying liquid to said chamber, a second feed system for supply a second liquid to said chamber, a valve member for controlling the discharge of liquid from said mixing chamber, means for causing the liquid to flow in said feed systems, a valve member in each feed system for controlling the flow of liquid to said mixing chamber and means for interlocking the discharge valve of said mixing chamber with both of the control valves in said feed systems, said means being adapted to open the discharge valve when either one of said control valves in the feed system are open and to close the discharge valve when both of said valves in the feed system are closed, and in which the valve control member in the feed system comprises a housing having a hollow chamber therein, one wall of which is provided with an inlet opening and an outlet opening, a valve plate rotatively mounted in said chamber in position against said wall, means for pressing the valve plate against the wall to provide a liquid seal for the said inlet and outlet openings, means for rotating the valve plate, an opening in said valve plate which is brought in alignment with said inlet and outlet openings upon rotation of the valve plate.

15. In a proportioning apparatus for mixing and dispensing a plurality of liquids of the type which includes at least two pumps and a mixing chamber for dispensing the mixed liquids, the improvement which comprises a shaft, means for driving the shaft, a second shaft mounted in position substantially parallel to said drive shaft, means for moving the second shaft towards and away from said drive shaft without changing the parallel arrangement of said two shafts, a walking beam, pivotal means for slidably mounting said walking beam on said second shaft, means for connecting said walking beam to the drive shaft to cause the walking beam to pivot on said second shaft.

16. In a proportioning apparatus for mixing and dispensing a plurality of liquids of the type which includes at least two pumps and a mixing chamber for dispensing the mixed liquids the improvement which comprises a shaft, means for driving the shaft, a second shaft mounted in position substantially parallel to said drive shaft, means for moving the second shaft towards and away from said drive shaft without changing the parallel arrangement of said two shafts, a pair of walking beams, pivotal means for slidably mounting each of said walking beams on said second shaft, means for connecting each of said walking beams to the drive shaft adapted to cause the walking beams to pivot on said second shaft.

17. A structure as specified in claim 16 in which the pivotal means for slidably mounting the walking beam on said second shaft include a bearing for said second shaft which is slidably mounted on a fixed support to carry the weight of said shaft, a second bearing on said shaft which slidably mounts the walking beam in pivotal position on said shaft, a pair of gears mounted in fixed position on said second shaft one of said gears being in meshed engagement with a gear rack mounted in fixed position on said fixed support and the second of said gears being in meshed engagement with a second gear rack mounted in fixed position on said walking beam.

18. A proportioning apparatus for dispensing liquids which comprises a chamber from which the liquid is dispensed, pump means for feeding liquid to said chamber, an electric motor for driving the pump means, a timing control element, means for moving said timing control element through a predetermined timing cycle, a cam carried by said timing control element, a contact arm in position to be contacted and moved in one direction by said cam, an electric switch connected to said contact arm adapted to be closed when the contact arm is moved by said cam, electric means connected to said switch adapted to start the motor when said switch is closed to feed liquid to the mixing chamber, and separate electric means for moving the contact arm in a second direction after the arm has been moved in said one direction by the cam, to reset the timing control element.

19. A structure as specified in claim 18 in which the separate electric means for resetting the control element include a solenoid for moving the contact arm in said second direction for resetting the control element and spring means for resetting the element to repeat a timing cycle.

20. A pump comprising:
 (a) a pump housing with a chamber having a wall with an inlet and outlet port therein for respectively conducting fluid into and out of said chamber;
 (b) a valve plate rotatively mounted within the chamber against the wall having the inlet and outlet ports to seal the ports to the chamber, said valve plate having an opening which may be positioned by rotation of the valve plate on its mount to open either one of said ports to said chamber;
 (c) a drive means for continuously rotating the valve plate on its mount to alternately open the inlet and outlet ports to the chamber;
 (d) a cylinder communicating with said chamber;
 (e) a piston within said cylinder which alternately applies suction and pressure to the chamber as it reciprocates in the cylinder; and
 (f) means for reciprocating the piston in synchronism with the rotation of the plate to apply suction to the chamber when the inlet port is open to draw liquid through the inlet port into the chamber and to apply pressure on the chamber when the outlet port is open to force liquid brought into the chamber through the inlet port out the outlet port.

21. A device for mixing and dispensing a mixture of two liquid resins, one more viscous than the other with a liquid catalyst for the resins comprising:
 (a) storage means for separately storing the more viscous resin, the less viscous resin and the catalyst;
 (b) a mixing means for homogenously mixing the more viscous resin, the less viscous resin and the catalyst together;
 (c) a first, second and third pump means for respectively pumping the more viscous resin, the less viscous resin and the catalyst individually from the storage means into the mixing means;
 (d) drive means for driving said first, second and third pump means to cyclically pump a measured amount of each of the more viscous resin, the less viscous resin and the catalyst respectively into the mixing means, said drive means including:
  (1) a first control means to simultaneously change the amount of each of the more viscous resin, the less viscous resin and the catalyst pumped into the mixing chamber during each cycle without changing the proportion of each the more viscous resin, the less viscous resin and the catalyst pumped each cycle with respect to the combined amount of resin and catalyst pumped each cycle,
  (2) a second control means for simultaneously changing the amount of each the more viscous and the less viscous resin pumped each cycle without changing the combined amount of resin pumped each cycle and without changing the amount of catalyst pumped each cycle, and
  (3) a third control means for changing the amount of catalyst pumped each cycle without changing the combined amount of resin pumped each cycle, and
 (e) means for dispensing the mixture from the mixing means in measured amounts.

References Cited in the file of this patent

UNITED STATES PATENTS

| | | |
|---|---|---|
| 1,161,557 | Weatherhead | Nov. 23, 1915 |
| 1,964,028 | Boynton et al. | June 26, 1934 |
| 2,207,942 | Persons | July 16, 1940 |
| 2,498,993 | Kuther | Feb. 28, 1950 |
| 2,762,307 | Orloff | Sept. 11, 1956 |
| 2,785,638 | Moller | Mar. 19, 1957 |
| 2,895,644 | Pande | July 21, 1959 |
| 2,946,488 | Kraft | July 26, 1960 |
| 2,971,382 | Harris | Feb. 14, 1961 |
| 3,018,922 | Williamson | Jan. 30, 1962 |